(12) United States Patent
Chang

(10) Patent No.: US 8,529,111 B2
(45) Date of Patent: Sep. 10, 2013

(54) NOTEBOOK COMPUTER HAVING DUAL DISPLAY SCREENS

(76) Inventor: Nai-Chien Chang, Sanchong (TW)

( * ) Notice: Subject to any disclaimer, the term of this patent is extended or adjusted under 35 U.S.C. 154(b) by 234 days.

(21) Appl. No.: 12/689,425

(22) Filed: Jan. 19, 2010

(65) Prior Publication Data

US 2010/0202105 A1    Aug. 12, 2010

(30) Foreign Application Priority Data

Feb. 12, 2009 (TW) .............................. 98202027 U
Dec. 31, 2009 (TW) .............................. 98224957 U (51) Int. Cl.
 *F21V 7/04* (2006.01)
(52) U.S. Cl.
 USPC .............................. 362/602; 362/612; 349/65
(58) Field of Classification Search
 USPC .............................. 362/600–634; 349/61–65
 See application file for complete search history.

(56) References Cited

U.S. PATENT DOCUMENTS

| | | | |
|---|---|---|---|
| 5,796,577 A * | 8/1998 | Ouchi et al. ............. | 361/679.09 |
| 6,859,365 B2 * | 2/2005 | Koiwa et al. ............. | 361/679.27 |
| 7,290,918 B2 * | 11/2007 | Han et al. ....................... | 362/616 |
| 7,433,179 B2 * | 10/2008 | Hisano et al. ............. | 361/679.27 |
| 2005/0024566 A1 * | 2/2005 | MacIntyre et al. ............. | 349/122 |
| 2005/0073627 A1 * | 4/2005 | Akiyama ......................... | 349/65 |
| 2008/0174718 A1 * | 7/2008 | Ma et al. ......................... | 349/62 |
| 2009/0322983 A1 * | 12/2009 | Hashino ........................... | 349/61 |

FOREIGN PATENT DOCUMENTS

TW           592326          6/2004

* cited by examiner

*Primary Examiner* — Sean Gramling
(74) *Attorney, Agent, or Firm* — Chun-Ming Shih; HDLS IPR Services (57) ABSTRACT

A notebook computer having dual display screens includes a backlight module, a first liquid crystal panel, a second liquid crystal panel, a first protective layer, a second protective layer, and a frame. The backlight module is constituted of a light guide plate and a plurality of light guide sources. The first liquid crystal panel is adhered to one side of the backlight module for displaying images of a picture. The second liquid crystal panel is adhered to the other side of the backlight module for displaying a picture identical to or different from that of the first liquid crystal panel. The picture of the second liquid crystal panel is displayed in a direction reverse to that of the first liquid crystal panel. The first protective layer is adhered to one side of the first liquid crystal panel. The second protective layer is adhered to one side of the second liquid crystal panel. The frame is configured to border the backlight module, the first liquid crystal panel, the second liquid crystal panel, the first protective layer and the second protective layer, thereby forming a display screen having dual displayed pictures.

7 Claims, 7 Drawing Sheets

NOTEBOOK COMPUTER HAVING DUAL DISPLAY SCREENS

BACKGROUND OF THE INVENTION

1. Field of the Invention

The present invention relates to a computer, and in particular to a notebook computer having dual display screens.

2. Description of Prior Art

Since notebook computer is compact, light and easy for carry, many salesmen like to carry a notebook computer when they go out for business, by means of which they can introduce the functions and features of their products to the clients or cooperative factories.

With the continuous advancement in science and technology, meeting rooms in many companies are each equipped with an overhead projector. When the salesman connects the signal output port of the notebook computer to the signal input port of the overhead projector, the overhead projector can project the images or pictures of the computer on a screen, so that the salesman can make a representation or brief.

If the meeting room is not equipped with an overhead projector, the salesman cannot choose but turn the notebook computer to face those who participate the meeting. However, in this condition, it is inconvenient for the salesman to make a representation or brief because the salesman cannot see the displayed pictures on the notebook computer easily. On the other hand, if there are too many people participating the meeting, some people may not see the displayed pictures of the notebook computer.

In order to solve the above drawbacks, Taiwan Patent No. 592326 entitled "External Display Module for Notebook Computer" discloses an external display screen, which can be externally connected to the back surface of the cover of the current notebook computer. When the original display screen of the cover is displaying images, the external display screen is also displaying the same images synchronously. Although such a solution makes more people able to see the images, the external display screen will inevitably increase the volume of the cover of the notebook computer and is inconvenient for a user to carry.

SUMMARY OF THE INVENTION

The present invention is to additionally provide a display screen on the back surface of the cover of the notebook computer, so that both the front surface and the back surface of the cover have a display screen respectively. The display screen on the back surface of the cover can be controlled by the computer host to display the image in synchronization with the original display screen of the cover or to display different images.

The present invention is to provide a notebook computer having dual display screens, including;

a backlight module constituted of a light guide plate and a plurality of light guide sources, the light guide sources being light guide strips each made of a plurality of light emitting diodes and a circuit board, the light guide sources being adhered to the periphery of the light guide plate;

a first liquid crystal panel adhered to one side of the backlight module for displaying images of a picture;

a second liquid crystal panel adhered to the other side of the backlight module for displaying a picture identical to or different from that of the first liquid crystal panel, the picture of the second liquid crystal panel being displayed in a direction reverse to that of the first liquid crystal panel;

a first protective layer adhered to one side of the first liquid crystal panel;

a second protective layer adhered to one side of the second liquid panel; and a frame for bordering the backlight module, the first liquid crystal panel, the second liquid crystal panel, the first protective layer and the second protective layer, thereby forming a display screen having dual displayed pictures.

DETAILED DESCRIPTION OF THE INVENTION

The characteristics and technical contents of the present invention will be described with reference to the accompanying drawings.

Figure 1:
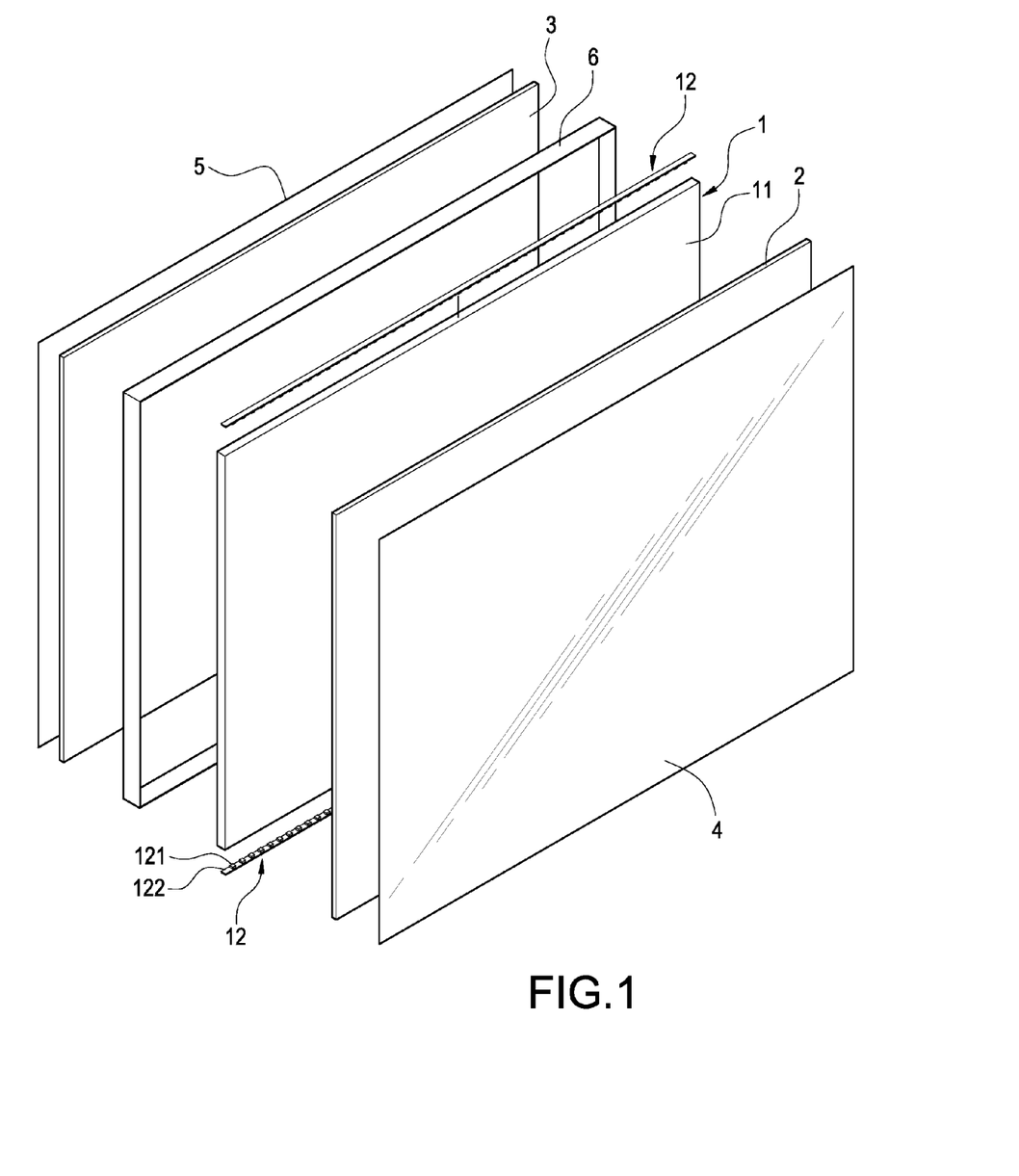
FIG. 1 is a perspective view showing the external appearance of the present invention.
Figure 2:
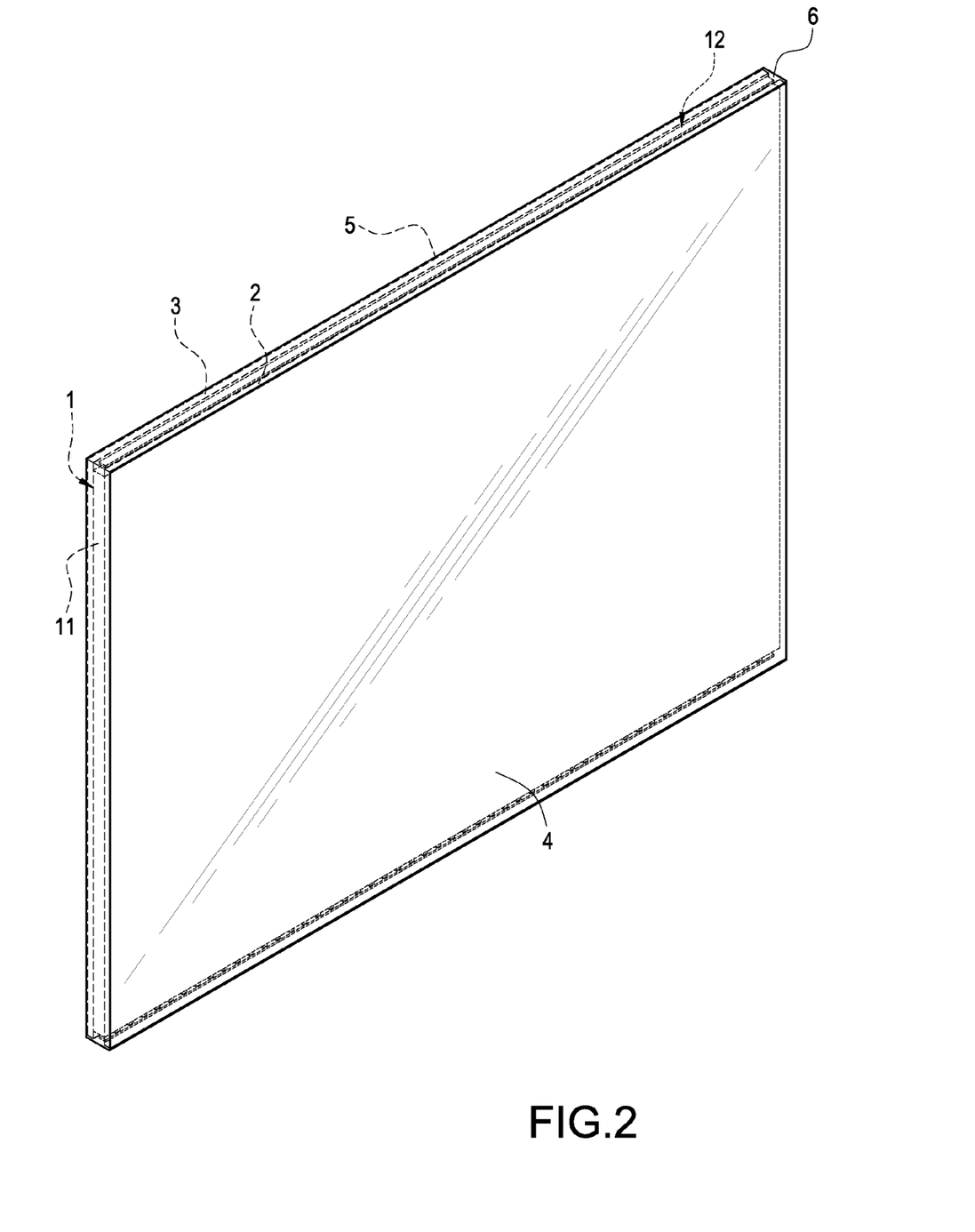
FIG. 2 is an assembled perspective view of the present invention.

Please refer to FIGS. 1 and 2. FIG. 1 is a perspective view showing the external appearance of the present invention, and FIG. 2 is an assembled perspective view of the present invention. As shown in these figures, the present invention provides a notebook computer having dual display screens, which includes a backlight module 1, a first liquid crystal panel 2, a second liquid crystal panel 3, a first protective layer 4, a second protective layer 5, and a frame 6.

The backlight module 1 is constituted of a light guide plate 11 and a plurality of light guide sources 12. Each of the light guide sources 12 is a light guide strip made of a plurality of light emitting diodes 121 and a circuit board 122 for abutting the periphery of the light guide plate 11. When each of the light guide sources 12 is lighted up, it emits light onto the light guide plate 11, thereby illuminating the light guide plate 11.

The first liquid crystal panel 2 is adhered to one side of the backlight module 1 for displaying images of a picture.

The second liquid crystal panel 3 is adhered to the other side of the backlight module 1 for displaying a picture identical to or different from that of the first liquid crystal panel 2. The picture of the second liquid crystal panel 3 is displayed in a direction reverse to that of the first liquid crystal panel 2.

The first protective layer 4 is made of a transparent plastic material and adhered to one side of the first liquid crystal panel 2 for protecting the first liquid crystal panel 2 from suffering damage due to foreign objects.

The second protective layer 5 is made of a transparent plastic material and adhered to one side of the second liquid crystal panel 3 for protecting the second liquid crystal panel 3 from suffering damage due to foreign objects.

The frame 6 is configured to border the backlight module 1, the first liquid crystal panel 2, the second liquid crystal panel 3, the first protective layer 4, and the second protective layer 5, thereby forming a display screen with its both surfaces displaying pictures.

Figure 3:
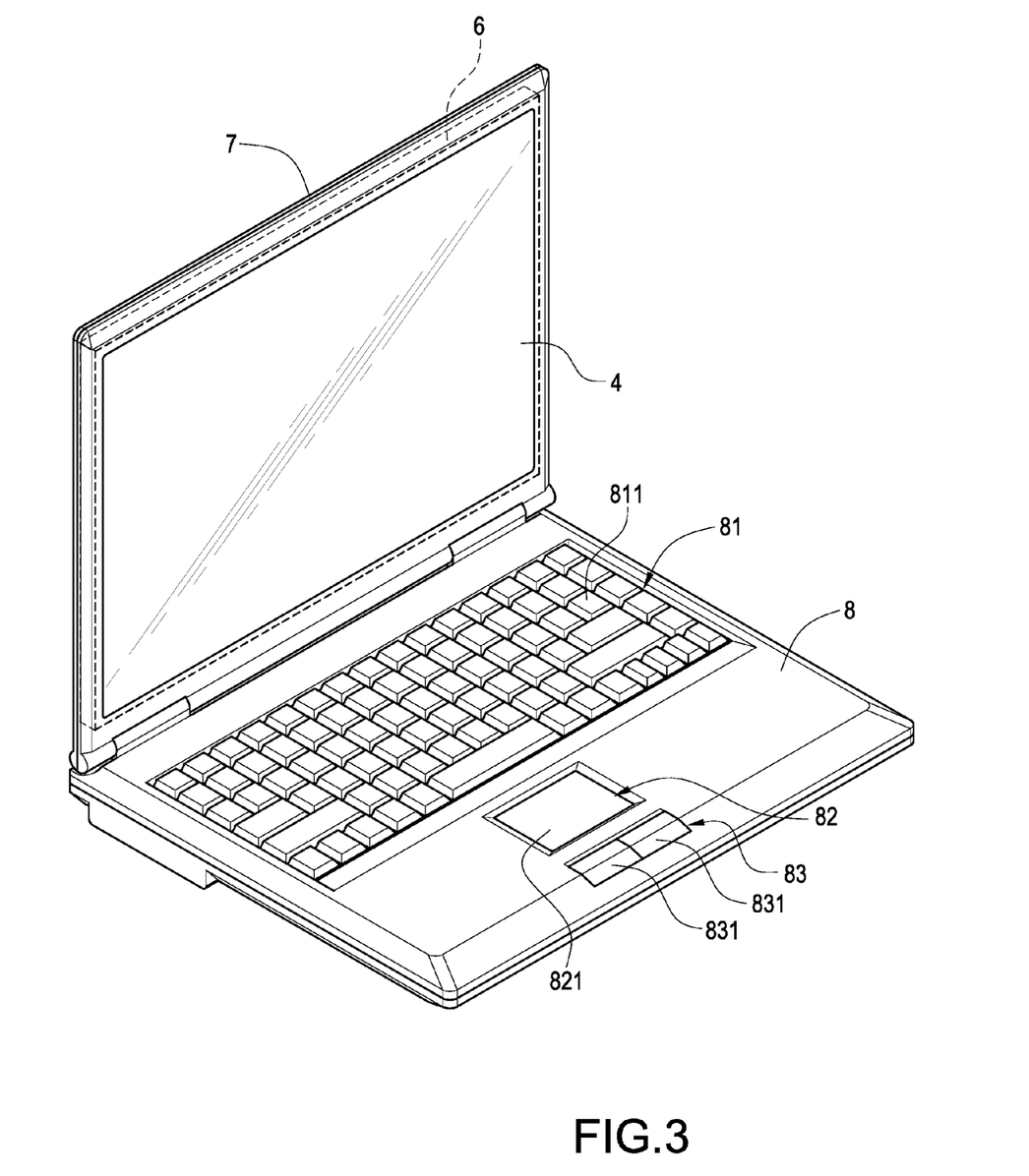
FIG. 3 is a front view showing the notebook computer having dual display screens of the present invention.
Figure 4:
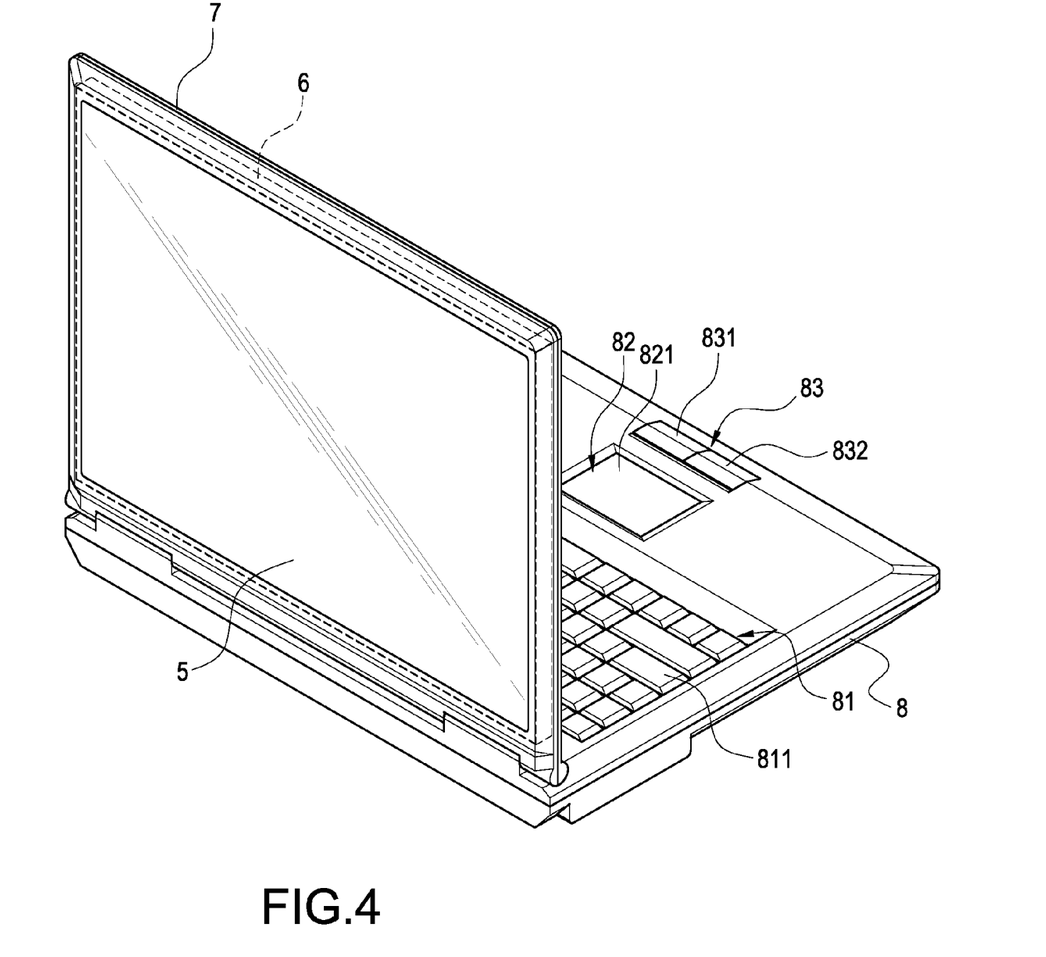
FIG. 4 is a rear view showing the notebook computer having dual display screens of the present invention.
Figure 5:
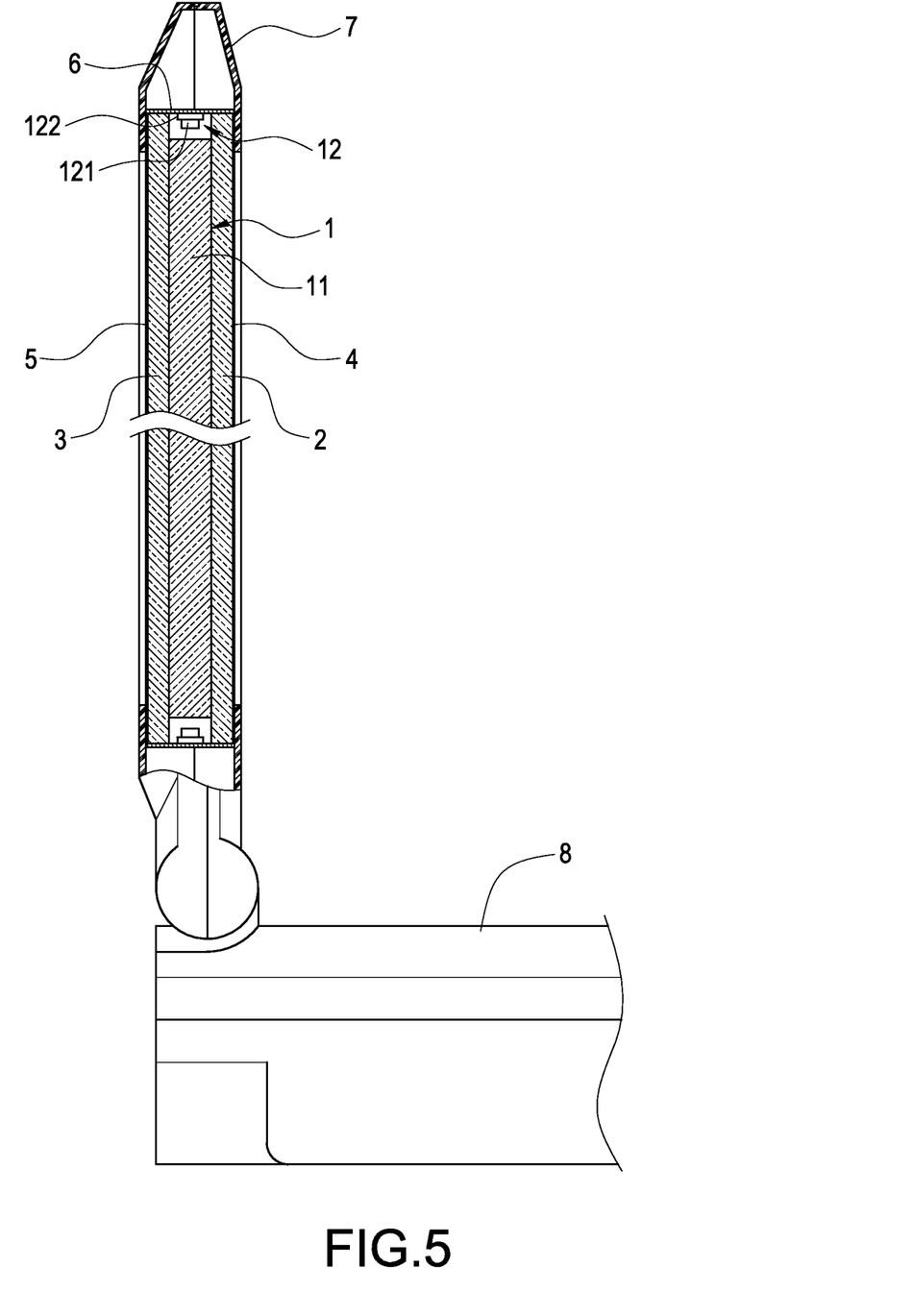
FIG. 5 is a side view showing the notebook computer having dual display screens of the present invention.

Please refer to FIGS. 3 to 5. FIG. 3 is a front view showing the notebook computer having dual display screens of the present invention. FIG. 4 is a rear view showing the notebook computer having dual display screens of the present invention. FIG. 5 is a side view showing the notebook computer having dual display screens of the present invention. As shown in these figures, after the above-mentioned display screen is assembled completely, it is mounted on a casing 7 of a notebook computer, the casing 7 is pivotally connected to a computer host 8. The computer host 8 has a first operating zone 81, a second operating zone 82, and a third operating zone 83. The first operating zone 81 is constituted of a plurality of keys 811 for executing the input of various characters, numerals, symbols or the like. The second operating zone 82 is constituted of a touch pad 821. When the finger of the user slides on the second operating zone 82, the user can control the movement of the cursor of the computer. The second operating zone 83 is constituted of a left key 831 and a right key 832. The left key 831 and the right key 832 have the same functions as those of the left key and right key of a traditional mouse.

The first liquid crystal panel 2 and the second liquid crystal panel 3 are electrically connected to at least one driver (not shown). The driver is electrically connected to a mother board (not shown) in the computer host 8 by means of a flexible flat cable to control the display state of the first liquid crystal panel 2 and the second liquid crystal panel 3.

When the user lifts the casing 7 to use the notebook computer, the first liquid crystal panel of the casing 7 displays a picture indicating a normal operation of the computer system (such as Excel, word, Adobe, Outlook Express or Power Point). The second liquid crystal panel 3 displays a picture of time, photos, date or various patterns. Alternatively, the user can set the mother board of the computer host 1 not to drive the second liquid crystal panel 3 for display.

When the user introduces or briefs the features and functions of his/her products to the client in a meeting, if the meeting room is not equipped with an overhead projector, the user can utilize the first operating zone 81, the second operating ozone 82 or the third operating zone 83 of the computer host 8, so that the mother board of the computer host 8 can control the first liquid crystal panel 2 and the second liquid crystal panel 3 to display the same picture. Also, the two pictures displayed on the first liquid crystal panel 2 and the second liquid crystal panel 3 respectively are reverse to each other in the left-and-right direction, so that the picture seen by people sitting opposite to the user is the same as that seen by the user. Further, when the user moves the cursor, people sitting opposite to the user can also see the cursor is moving.

Since the present invention can display images with two display screens, the user needs not to turn the notebook computer to face the people participating the meeting when the user introduces the features and functions of the product. Thus, the convenience in use is increased.

Figure 6:
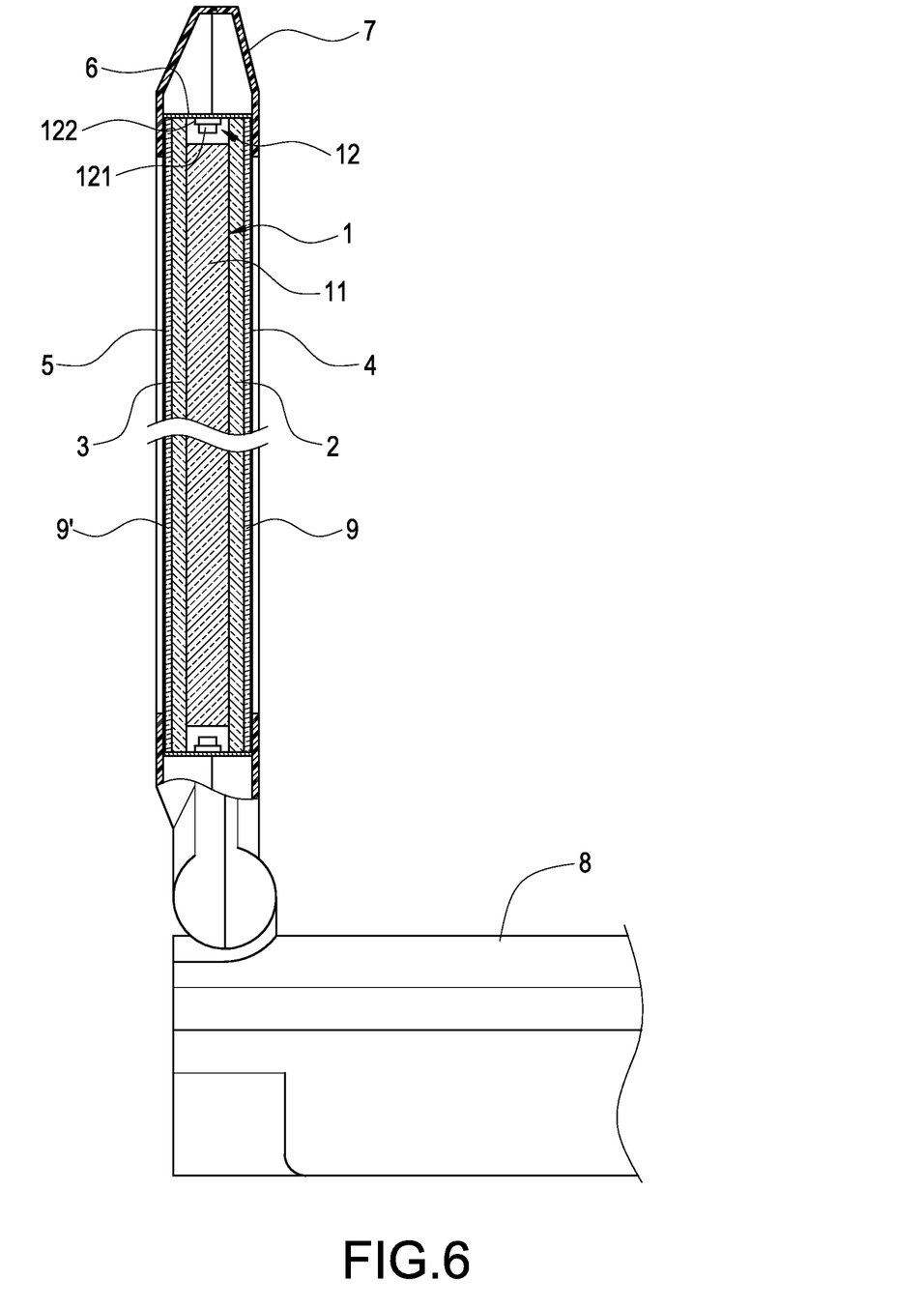
FIG. 6 is a schematic view showing another embodiment of the present invention.

Please refer to FIG. 6, which shows another embodiment of the present invention. As shown in this figure, a first touch pad 9 is disposed between the first protective layer 4 and the first liquid crystal panel 2. A second touch pad 9' is disposed between the second protective layer 5 and the second liquid crystal panel 3. The first touch panel 9 and the second touch panel 9' are electrically connected with at least one driver (not shown). The driver is electrically connected with a mother board (not shown) in the computer host by means of the flexible flat cable. With this arrangement, the user can operate directly on the first touch pad 9 and the second touch pad 9'.

Figure 7:
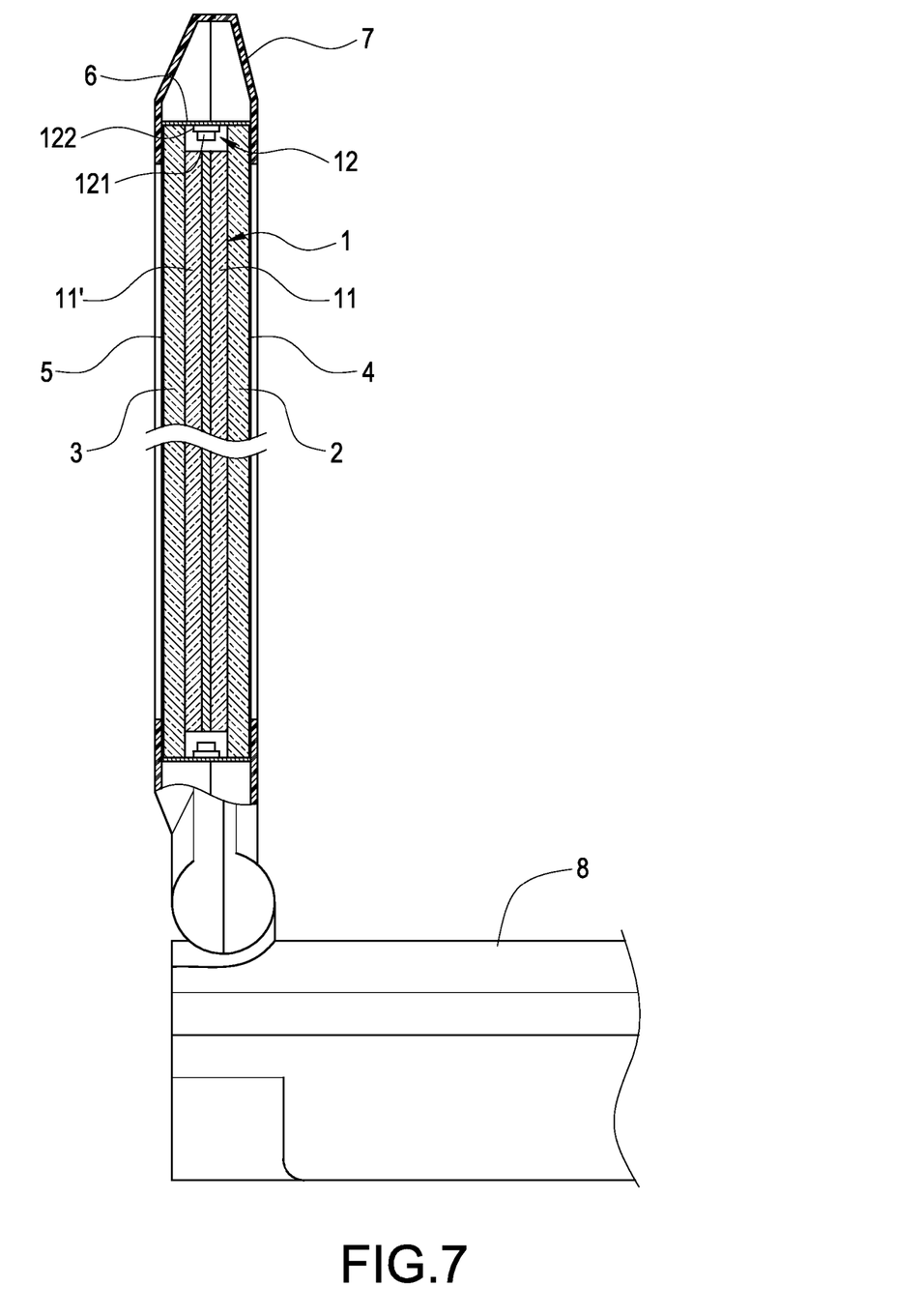
FIG. 7 is a schematic view showing a further embodiment of the present invention.

Please refer to FIG. 7, which shows a further embodiment of the present invention. As shown in this figure, two light guide plates 11 and 11' are disposed between the first liquid crystal panel 2 and the second liquid crystal panel 3. The two light guide plate 11 and 11' can uniformly guide the light onto the first liquid crystal panel 2 and the second liquid crystal panel 3.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A notebook computer having dual display screens, including:
    a backlight module constituted of at least one light guide plate and a plurality of light guide sources, the light guide sources being arranged to the periphery of the light guide plate, wherein the light guide source is constituted of a plurality of light emitting diodes disposed on a circuit board;
    a first liquid crystal panel adhered to one side of the backlight module for displaying images of a picture;
    a first protective layer, which is made of a transparent material, adhered to one side of the first liquid crystal panel;
    a touch display screen, having a second liquid crystal panel adhered to the other side of the backlight module and a touch pad adhered to the second liquid crystal panel, for displaying a picture identical to that of the first liquid crystal panel, the picture of the second liquid crystal panel being displayed in a direction reverse to that of the first liquid crystal panel;
    a second protective layer, which is made of a transparent material, directly adhered to the touch pad; and
    a frame for bordering the backlight module, the first liquid crystal panel, the first protective layer, the second liquid crystal panel and the second protective layer, thereby forming a display screen having dual displayed pictures, wherein the light guide sources are directly adhered to inner walls of the frame corresponding to the periphery of the light guide plate,
    wherein when either one of the first liquid crystal panel and the touch display screen is configured to display, all of the light guide sources are illuminated, and
    wherein the notebook computer can display images with two display screens simultaneously so that a user needs not to turn the notebook computer to face people participating a meeting when the user performs a presentation, and when the user moves the cursor, people sitting opposite to the user can also see the cursor is moving.

2. The notebook computer having dual display screens according to claim 1, wherein another touch pad is disposed between the first protective layer and the first liquid crystal panel in the frame, the first touch pad is electrically connected to at least one driver, and the driver is electrically connected with a mother board in a computer host by means of a flexible flat cable so as to make the first liquid crystal panel as another touch display screen.

3. The notebook computer having dual display screens according to claim 1, wherein the assembly of the backlight module, the first liquid crystal panel, the touch display screen and the frame is disposed in a casing, the casing is pivotally connected to a computer host, and the computer host has a first operating zone, a second operating zone, and a third operating zone.

4. The notebook computer having dual display screens according to claim 3, wherein the first operating zone is constituted of a plurality of keys.

5. The notebook computer having dual display screens according to claim 3, wherein the second operating zone is constituted of a touch pad.

6. The notebook computer having dual display screens according to claim 3, wherein the third operating zone is constituted of a left key and a right key.

7. The notebook computer having dual display screens according to claim 3, wherein the first liquid crystal panel and the touch display screen are electrically connected to at least one driver, and the driver is electrically connected to a mother board in a computer host by means of a flexible flat cable.

* * * * *